United States Patent Office.

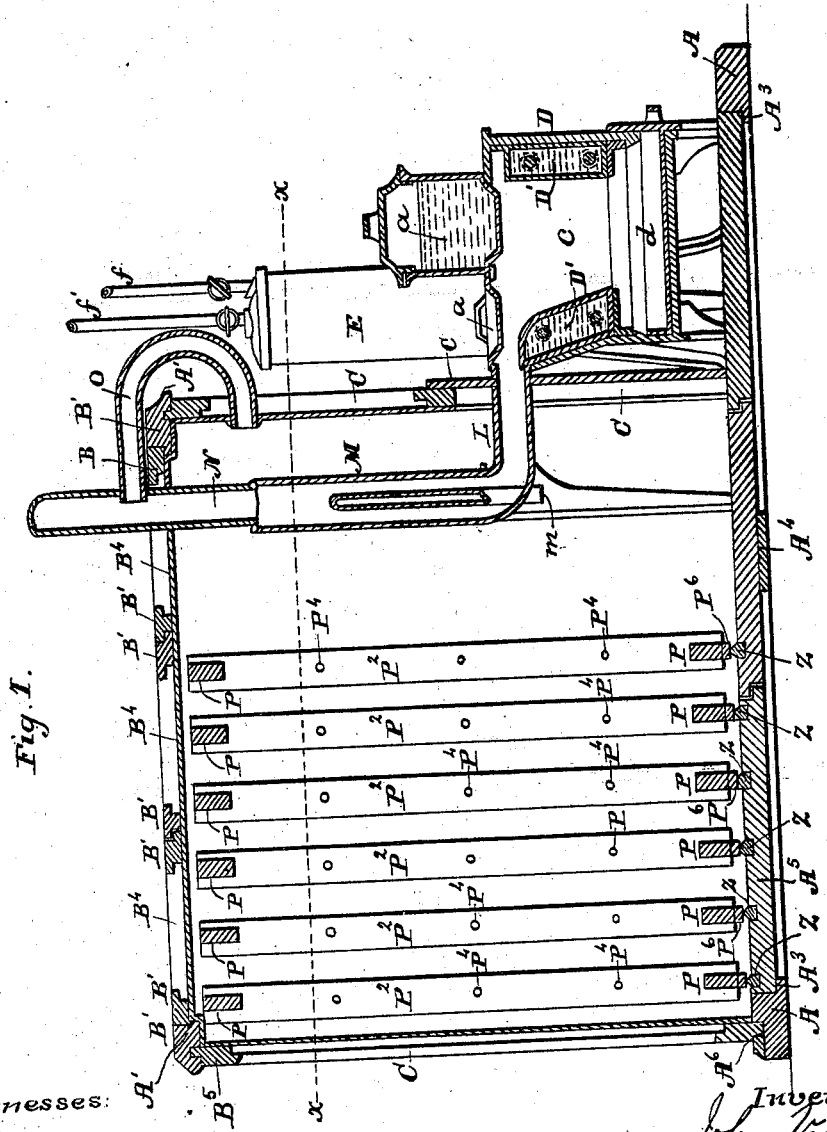

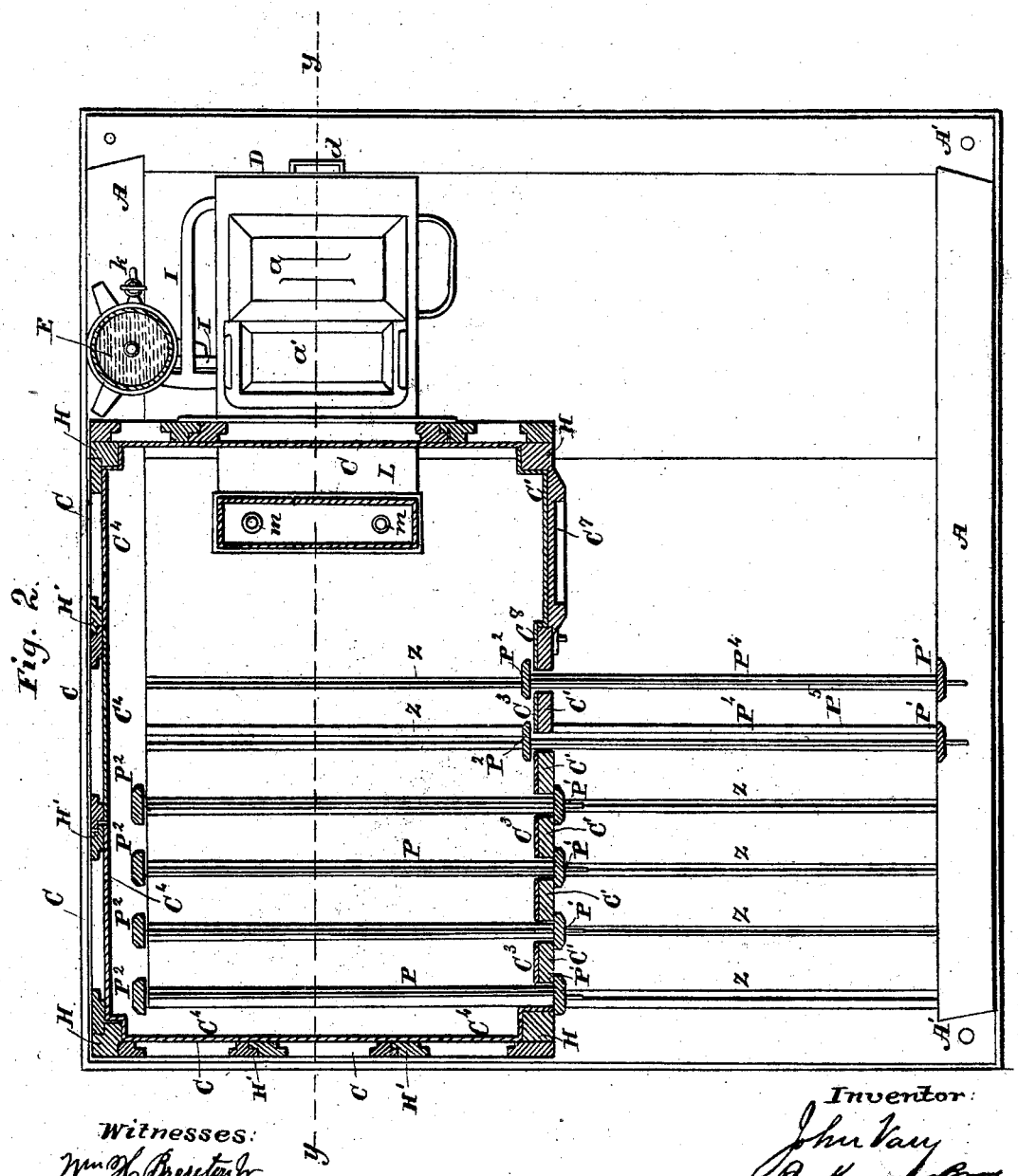
J. VAN.
Drying Apparatus for Laundries.
No. 89,815.
Patented May 4, 1869.

JOHN VAN, OF CINCINNATI, OHIO.

Letters Patent No. 89,815, dated May 4, 1869; antedated April 16, 1869.

PORTABLE LAUNDRY.

The Schedule referred to in these Letters Patent and making part of the same.

*To all whom it may concern:*

Be it known that I, JOHN VAN, of Cincinnati, in the county of Hamilton, and State of Ohio, have invented certain new and useful Improvements in Portable Laundries; and I do hereby declare the following to be a full, clear, and exact description of the same, reference being had to the accompanying drawings, which are made a part of this specification.

My invention consists of a portable laundry, embracing drying-room, laundry-stove, and attachments for heating water, boiling the clothing, and heating smoothing-irons, &c.

The drying-room is so constructed as to be portable, being built in sections, as hereafter described, so that it can be easily taken down and apart, ready for packing in a small compass for shipping-purposes. This room is lined with zinc, provided with frames, or racks, upon which to hang the clothing, &c., to be dried, which ride on track-bars, or shears. It is also provided with a ventilating-pipe, to carry off vapor, and heated by means of a sheet-iron drum, attached to the rear of the laundry-stove. This drum is constructed with two air-pipes passing perpendicularly through it, giving a circulation of air through the heated drum.

My invention also consists of a laundry-stove, constructed in such a manner as to cause the fire to perform the separate offices of heating water for the purpose of washing, heating the water in a boiler to boil the clothes, heating the irons for ironing them, and heating the drum in the room for drying them.

The water is heated by the use of one or more water-chambers placed in the fire-box. The water circulates through these heating-chambers by means of connecting-pipes leading to and from the hydraulic boiler or water-tank, to be described hereafter.

In the accompanying drawings—

Figure 1 represents a vertical longitudinal section of my combined portable dry-room and laundry on the line $y$–$y$, fig. 2.

Figure 2 represents a horizontal section on the line $x$–$x$, fig. 1.

Similar letters of reference indicate corresponding parts in the drawings.

A represents the bottom frame-work of the laundry, constructed in sections, and connected, as shown at $A^1$, by a lap, or other proper kind of joint. At the corners $A^1$, the frame is fastened together by means of any suitable joint, or by mortise and tenon and pins, bolts, or other device to keep them in position.

The flooring $A^5$ is in sections, also, of a convenient size to permit of ease in handling, and is inserted by means of a rabbet-joint, $A^3$, extending around the entire inner edge of the frame A A.

The flooring may be strengthened by and receive an additional support from cross-pieces, or sills $A^4$.

The flooring may be of any desired and suitable size, form, or extent, so that it be adapted to the frame A.

The upper surface of the base-frame A is traversed longitudinally, near the edge, by a groove, $A^6$, of sufficient width to receive the lower ends of the sides C C of the drying-room, and of sufficient depth to hold them firmly in position when they are put in place.

The dry-room is constructed of any suitable material and any desired size, (I prefer, however, to have it cover about one-third of the area of the floor,) in the following manner.

A frame-work, B, corresponding in size to that of the dry-room, is first constructed, by uniting and fastening the pieces composing it together in the same manner as the bottom already described.

This top frame is also provided with grooves $B^6$, adapted to receive the upper ends of the sides C $C^1$.

The top frame, like the bottom, is to be fastened together by pins, bolts, clamps, or other suitable means.

The corner-posts H, fig. 2, are then set into place, and the top frame B is raised upon them, or the posts H may be stood in place, and the sides C C also placed in the grooves $A^6$, designed for them, and then the top frame-work B put up separately, and all fastened together at once, in the manner set forth.

The top and bottom frames B and A, and the corner-posts H, bind and hold the other parts of the dry room in position.

After having secured the skeleton frame-work A B H in position, before finally fastening it, the sides C are to be inserted by fitting the ends into the grooves $A^6$ and $B^6$, designed for their reception, at the top and bottom. These sides are lined with sheet-metal, as are also the inner surfaces of the pieces composing the frame-work A B H and the roof and flooring, making, when the dry-room is completed, a continuous and complete sheathing of metal on the inside of the room, which protects the wood-work from the effects of the dampness necessarily consequent upon the hanging damp clothes within, and from the vapor thrown off during the process of drying. The manner in which the sides C are to be sheathed or lined with metal may be varied at pleasure.

The sections $C^1$ are simply strips of wood separating the drying-bars P, which are placed upon the rails Z before fastening the frame together. These sections $C^1$ are lined by placing zinc, or other metal, $C^3$, on their inner surface, and fastening in any proper manner.

The sections C may be constructed in the same manner, wholly of wood, and lined, or they may be made to consist of a frame-work, the pieces of which, $H'$, are only some few inches wide, upon the inner surface of which zinc, or other metal, $C^1$, may be fastened, making the section from the outside have the appearance of panelling, while the inner surface presents a smooth metallic wall.

This latter method of construction may be preferable, for it increases the lightness and simplicity of the sections, saving a considerable amount of wood-work, which is supplied by the zinc or metal $C^1$, as described.

The roof of the dry-house is composed of sections, in the same manner as are the sides $H'$, C, or $C^1$.

$B'$ represents a sectional view of the frame-work, to which is fastened the zinc or metallic lining $B^4$, showing the manner in which the different sections of the top are united, by means of a lap, or rabbet-joint, and united to the top frame B in the same manner.

The sections C of the sides also join each other by a lap-joint.

$B^1$ represents the frame of the top, to which is fastened the metal sheeting, as described.

H' shows the frame-work of the sides, which supports the zinc or metal lining C of that portion of the dry-house.

The drying-frames are constructed of two horizontal bars, P P, one at the top and one at the bottom, connected by two perpendicular pieces, $P^1$ $P^2$, at the ends, and any number of horizontal cross-bars, or lines $P^4$, upon which to hang clothing to be dried.

The inner and outer ends $P^1$ $P^2$ of this frame form flanges projecting upon each side, overlapping the sides of the building, as shown in fig. 2. These flanges on the inside prevent the frame being drawn clear out.

The frames run on shears, or rails Z, and sustained in an upright position by means of the top and bottom rails of the frame itself, when in position.

Underneath the frame, upon the bottom rail, grooved rollers $P^6$ may be placed, to cause it to move more easily.

At $P^5$ are shown two dry-frames drawn out, as if for use.

Z represents the shears or rails.

Attached to and made part of the laundry is a stove, D, of suitable form, constructed to accommodate on top a boiler, $a$, for boiling clothes, and a plate, $a'$, upon which to heat smoothing-irons. This stove is also furnished with the water-heating chambers D' on all sides of the fire-box.

$c$ $d$ is the ash-pan, underneath the grate.

E is a water-tank, or reservoir, furnished with the cock $k$, for drawing off the water.

This tank is connected with the water-heating chambers D', by means of the pipes I I, fig. 2, and the hydraulic pressure causes the water to circulate from the tank to the heating-chambers freely.

$f'$ is a pipe, through which to fill the tank.

$f$, a pipe for the escape of steam.

The stove is placed close up to the side of the drying-room, and the flue L projects inside.

M is a drum for heating-purposes, with two pipes, $m$, running through it longitudinally, for the circulation of air.

N is the pipe to carry off the smoke, &c., rising out of the upper end of the drum M.

O is a pipe extending from the inside of the drying-room to the pipe N above the roof, for the purpose of carrying off the vapor, &c.

$C^7$ $C^8$ are the door of the dry-room, and its frame, constructed in sections like and inserted at the time the sides are.

Having thus described my invention,

What I claim as new therein, and desire to secure by Letters Patent, is—

1. The dry-room of a portable laundry, consisting of the sectional floor A $A^5$, posts H', upper frame, or plate B, and sections $B^1$ H', and provided with the metallic lining, substantially as and for the purpose set forth.

2. The metallic-lined sections $B^1$ C H' $C^1$ of the dry-room of the portable laundry, constructed in the manner described, for the purposes specified.

3. In the portable laundry, the stove D, constructed with the fire-box $c$, water-heating chambers D', air-heating drum M $m$, flues L N, and vapor-duct O, all arranged as described, in combination with the dry-house and water-reservoir, substantially as and for the purposes set forth.

4. The combined arrangement of the sectional floors A $A^5$, the dry-house B $B^1$ C H H', the clothes-frames P $P^1$ $P^2$ $P^4$, rails Z Z, stove D D' L M N O, and water-reservoir E, provided with the pipes $f$ $f'$, I I, and cock $k$, substantially as described, to form an improved portable laundry.

In testimony of which invention, I hereunto set my hand.

JOHN VAN.

Witnesses:
J. W. PATTERSON,
W. L. ALDRICH.